Oct. 27, 1964

H. W. HALVORSEN 3,154,663

APPARATUS AND PROCESS FOR THAWING TEMPERATURE
SENSITIVE FROZEN MATERIALS

Filed Jan. 30, 1959

INVENTOR.

BY HAROLD W. HALVORSEN

Albert L. Jeffers
Attorney

Oct. 27, 1964

H. W. HALVORSEN 3,154,663

APPARATUS AND PROCESS FOR THAWING TEMPERATURE
SENSITIVE FROZEN MATERIALS

Filed Jan. 30, 1959

INVENTOR.

BY HAROLD W. HALVORSEN

Albert L. Jeffers

Attorney

United States Patent Office 3,154,663
Patented Oct. 27, 1964

3,154,663
APPARATUS AND PROCESS FOR THAWING TEMPERATURE SENSITIVE FROZEN MATERIALS
Harold W. Halvorsen, Silver Spring, Md., assignor to National Scientific Laboratories, Inc., Washington, D.C., a corporation of Delaware
Filed Jan. 30, 1959, Ser. No. 790,273
2 Claims. (Cl. 219—10.49)

This invention relates to the apparatus and process for thawing temperature-sensitive frozen materials such as whole blood, the blood having been frozen to preserve it for future usage.

While the invention will be described extensively with reference to human blood it will be understood that the invention is capable of general application in the fields of temperature-sensitive materials and the invention is in no sense limited to thawing of whole blood.

Preserving whole blood under nonfreezing refrigeration is not entirely satisfactory because of the chemical alterations which normally occur with "aging" of blood. Storage by refrigeration also presents temperature control problems and requires sterile storage conditions which are difficult to maintain and are therefore costly. The nonfreezing refrigeration type of preservation is wasteful in the sense that the whole blood must be used within a period of time or else converted to less valuable derivatives, such as plasma.

While it has been known that blood can be frozen solid and retained indefinitely in a frozen state without substantial loss of beneficial physiological properties, this method of storage has not been made available because the blood in the process of thawing has become adversely affected by the effects of heat, particularly in the range of $-10°$ C. to $0°$ C.

It is an object of the present invention to provide both apparatus and process for thawing temperature-sensitive material such as blood during which process the thawing occurs by increments. The heating element for accomplishing this imparts sufficient heat to the frozen material so that the frame material becomes liquified in a short duration, the result being that deteriorative effects are avoided. This object is attained by means of a perforated heated member held in engagement with the frozen portion of the material by constant development of a biasing force thereon. As a result the thawing is "incremental" so that the frozen portion as it becomes thawed to a liquid is constantly passed through the perforated member and the exposed face of the solid frozen material is under constant engagement by the advancing perforated member.

It is a significant part of the invention that the heat producing thawing of the material need not traverse through the entire body of liquified blood but only through a thin film of liquified blood separating the disk and adjacent exposed face of solid frozen material, the result being that the temperature of the liquid material need not be substantially raised above the thawing temperature. The thin film layer is of such small dimensions as to be of little significance in impeding the rate of thawing of the blood or heating of the liquid blood.

The frozen blood may be either in the form of a solid mass or it may also be in the form of a fine powder which results from super cooling of the blood. In other words, the particular solid state form of the material is not critical but may be solid, pulverulent, granular, etc.

A further object of the invention is to effect thawing for the frozen contents of a container without opening the container, thus materially decreasing any likelihood of contamination or loss of sterile conditions.

It is an object of the invention to produce a remote heating of a perforated member by electromagnetic means wherein an alternating current is induced in said perforated member, and in other embodiments to produce a heating of the perforated member by using it as a resistance element in a circuit using the container walls as electrical conductors.

The perforated member can be biased through the blood or other frozen material either by mechanical means, such as a spring, or by electromagnetic reaction, for example, by means of a coil device. In both instances the material is packaged and frozen within the container as a unit with the perforated member forming an internal, integral part of the package which remains intact during the thawing process. The container may be of dielectric material to adapt it for usage with one of the embodiments of the invention. When the blood consists of a powder material, the freezing is performed separately from the container used in the thawing process and is then transferred to the container and sealed, this being performed, of course, under sterile conditions.

Other objects and features of the invention will become apparent from a consideration of the following description which proceeds with reference to the accompanying drawings, wherein.

Figure 1:
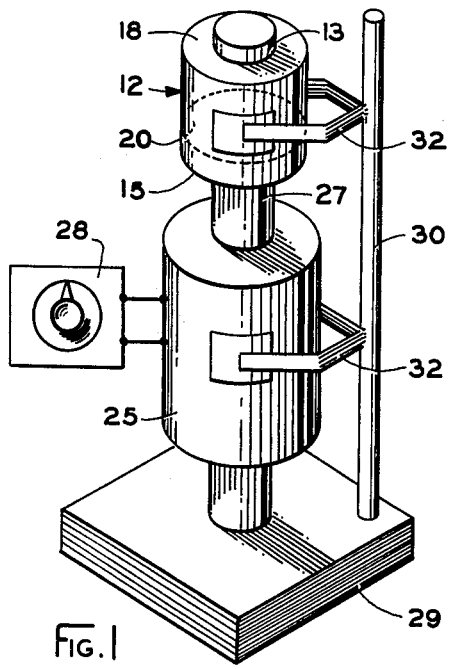
FIGURE 1 is an isometric assembly view of a container of blood and the heating apparatus for thawing the blood.
Figure 2:
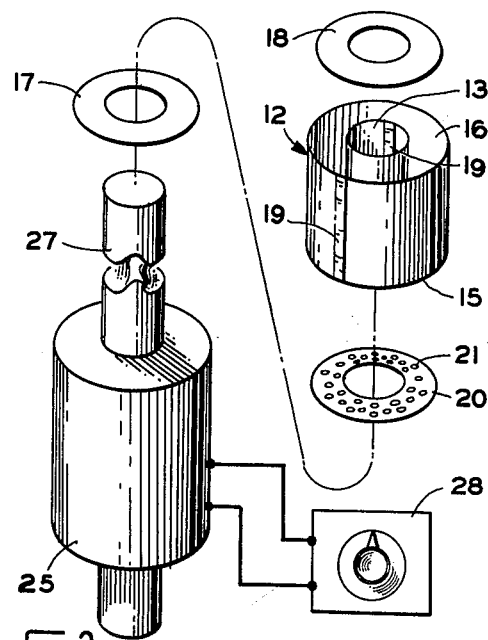
FIGURE 2 is an exploded view showing the separated individual parts of the container and heating apparatus.
Figure 3:
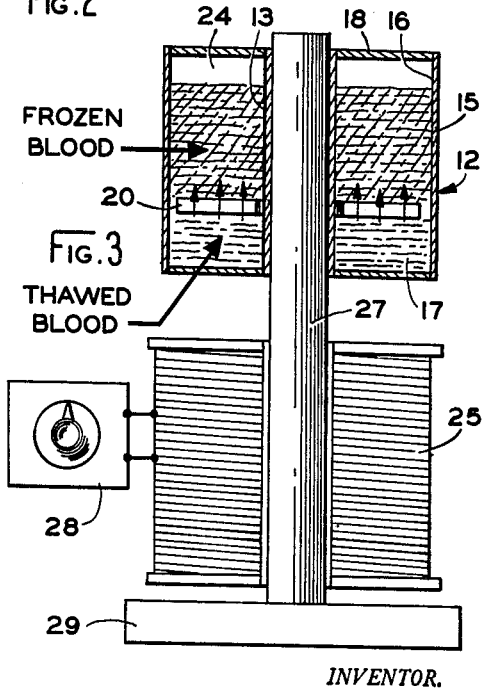
FIGURE 3 is a sectional view taken through the major axis of the container during the thawing process in which the heating disk has traversed a part of the length of the container and having liquid blood behind the line of travel of the disk and frozen blood in advance thereof.

Referring first to the embodiment shown in FIGURES 1-3 a cylindrical container 12 comprising concentric inner and outer tubular members 13 and 15 has an annular chamber 16 for receiving a charge of liquid blood therein. The open ends of the container are sealed with closure members 17 and 18 which shield the blood from the exterior and thereby maintain sterile conditions interiorly of the container 12. The closure members are of electrical insulation material and are apertured to provide an opening through the longitudinal axis of the container 12.

The walls of the two tubular members 13 and 15 have insulating strips 19 extending the length thereof so that the inner and outer metal walls formed by the tubular members 13 and 15 are electrically nonconductive about their circumference. The strips 19 may be of plastic material and of such characteristics as to allow for slight expansion of the container when the blood is frozen.

The two tubular members 13 and 15 are of heat conductive metallic material and are inert with respect to the blood contents so as not to affect its composition. There is further provided a tolerance space 24 at the upper level of the container 12 (FIGURE 3) to allow for expansion of the liquid blood as it is converted to a solid phase.

Before the top end seal 18 is added there is inserted a thin metal disk 20 having perforations 21 therein and the container is then sealed with its contents of fresh whole blood. The disk 20 should be highly conductive metallic material, preferably silver, copper or aluminum. The material must further be of such character that it will not affect the composition of the blood.

After the container 12 is filled, the disk 20 inserted, and the closures 17 and 18 are in place, the blood is frozen by immersion in a bath of heat transfer media such as liquid nitrogen at about −200° C. The blood is quickly reduced in temperature owing to the relatively large area of the heat transfer walls of the tubular members 13 and 15 as compared to the volume of the container. The walls are good heat conductors and as a result the temperature reduction is quite rapid and will freeze the blood without deteriorative effects on the blood.

The blood is now in condition for storage and may be preserved indefinitely in its frozen state at temperatures of about −40° C. or less.

When the blood is to be used it is thawed by means of a heating unit comprising an inductance coil 25 having an inductance coil core 27 extending beyond the inductance coil 25 and proportioned to fit within the inner tubular member 13. The core 27 may be of laminated coiled magnetic material. The inductance coil which holds the coil 25 and cylinder container 12 respectively in operative position, is supported on a base plate 29 and the upright standard 30 has clamps 32.

An alternating current source 28 is used to energize the coil 25 and suitable timing and control devices may be further included.

The technical difficulty surmounted by the present invention is that the blood, in the course of thawing, must not remain at the temperature region between −10° C. to 0° C. for any significant period of time or else the blood undergoes impairment. Blood can remain at this temperature range only for a time period of one second or less to avoid impairment.

In operation, the container is fitted over the core 27 with the metallic disk 20 located lowermost within the container 12, suitable marking being provided on the container to indicate which end position of the container contains the disk 20.

The container is then held fast either by hand or suitable clamping means 32 and the coil 25 is then energized, from the alternating current source 28 with the appropriate time and control setting.

The magnetic lines of flux transferred through core 27 and surrounding the disk 20 induce an alternating current flow in the disk 20 which becomes heated sufficiently to thaw the contiguous surface of the blood in engagement with the disk 20.

The lines of force from the inductance coil also develop a lifting action on the disk 20 tending to force it upwardly through the column of frozen blood (FIGURE 3) thawing the blood as it moves upwardly.

As the blood melts at the interface of the disk the liquid passes through the perforations 21 allowing for vertical passage of the disk 20 upwardly within the container. In this manner the disk always remains in solid contact with the exposed frozen end portion of the blood column and is subjected to the full heating action of the disk 20.

None of the heat developed by the disk 20 needs to be transferred through liquid blood in reaching the frozen blood. This is desirable because the liquid blood is not a good conductor and hence need not become exposed to high temperatures or serve as heat conducting medium to the frozen portion thereof.

Since the disk 20 passes through the blood by increments, the heating is localized and is applied only for a fraction of the time to each increment and only then when the portion is transforming from solid to liquid phase.

After the disk 20 has traversed the entire length of the cylinder then all portions of the frozen blood have become subjected to the heating action of the disk 20 and are completely liquified. The coil is now de-energized and the disk then settles downwardly to its original position within the container.

Figure 4:
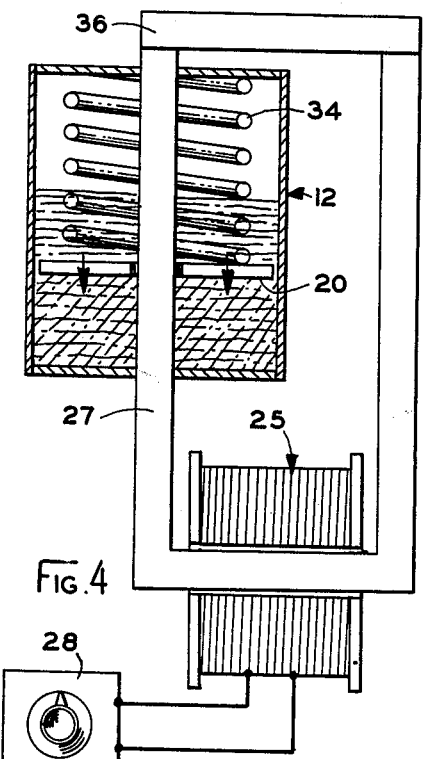
FIGURE 4 is another embodiment of the invention wherein the magnetic energy is transferred through a closed loop core, a portion of which is passed through the container.

The liquid blood is next heated to approximately body temperature, this being accomplished by the thawing device or a conventional heating means. The closure member 17 may now be removed and the blood is ready for use in liquid form. In the embodiment of FIGURE 4 the container 12 includes a perforated disk 20 just as in the previous embodiment but biassing of the disk 20 through the container is effected by a spring 34 which is compressed between the top cover 18 and the disk 20. The disk 20 effects heating of the blood to produce thawing thereof as it moves by increments across the length of the container 12.

The coil develops magnetic lines of force in a closed loop core 27 this being a more effective arrangement than a discontinuous single length core 27 of the previous embodiment. The closed loop core 27 includes a removable portion 36 which permits the container 12 to be fitted over and removed from the core 27.

Figure 6:
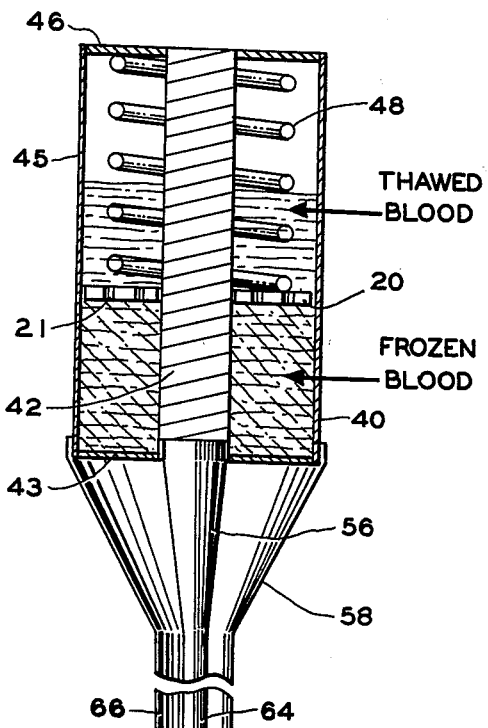
FIGURE 6 is a sectional view taken through the center of the container on line 6—6 when the thawing is partially completed.
Figure 5:
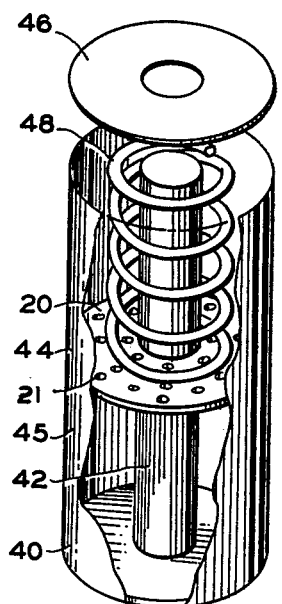
FIGURE 5 is an exploded isometric view of a second container and thawing apparatus for liquifying frozen blood.

Referring next to the embodiment shown in FIGURES 5 and 6, the disk 20 having perforations 21 may resemble that used in the previous embodiment. The principal difference, however, is that the disk 20 is of more highly resistive character so as to approximately terminate the coaxial type power transmission system. The resistance of the disk 20 may be in the order of 75 ohms as compared to about 75 micro ohms for the previous embodiment. The disk 20 may be further provided with a peripheral flange and not be in actual contact with the walls of the container (FIGURE 6) since very high frequency current may be transferred between disk 20 and walls of container 40 by the capacity of the flanged edges of the disk 20. The disk 20 is proportioned for slidable movement within a container 40 having concentric inner and outer cylinders 42 and 45. A closure member 43 is used to seal the one end of container 40 which is filled with liquid blood to about the level indicated by reference numeral 44.

The blood is then frozen by immersion of the container in a liquid nitrogen medium and the large surface area provided by the inner and outer metallic cylinders 42 and 45 provide for rapid heat transfer sufficient to freeze the blood without causing impairment of the blood. The perforated disk 20 is then fitted within container 40 and is proportioned to move slidably therein and provides electrical circuit through the inner and outer cylinders 42 and 45, respectively, as previously described.

A coil spring 48 is then compressed between the disk 20 and a strong end seal 46 which bears against the spring 48. The end seal 46 is of insulating material and it is apertured to fit over the inner cylinder 42. The closure 46 completely seals off the annular volume above the frozen blood and therefore safeguards the sterile conditions interiorly of the container.

In order to heat the disk 20 two funnel shaped electrical connections 56 and 58 are clamped over the ends of the inner and outer cylinders 42 and 45, respectively; these connections 56 and 58 are suitably connected with a radio frequency power generator 60; suitable controlling timing devices may be included to regulate the amount of energy which is transferred to the disk 20 through a convenient primary power source.

During the thawing process electrical energy is transmitted from the primary power source through conductors 64 and connection 56 to the inner cylinder 42 and thence through the disk 20 which is heated by the electrical energy since it acts as a resistance element of the circuit. The outer edge of the disk provides effective coupling with the inner walls of the cylinder 45 so that the cylinder 45 is made a part of the electrical circuit. The end of cylinder 45 is fitted within the electrical connection 58, thence to conductor 66. The conductors 64, 66 and the connections 56, 58 which are fitted to make contact with the ends of cylinders 42, 45 may consist of a special tapered coaxial cable and the cylinders 42, 45 are in effect a coaxial transmission line for communicating electrical energy continuously to the movable perforated disk 20, which becomes heated since it is a resistance element.

In operation, the spring 48 biasses the disk 20 against the column of frozen blood and the heated disk is caused to advance by increments as the frozen portion engaged by the disk is thawed to the liquid phase and is passed through the perforations 21. The disk continues to advance by increments through the cylinder at a rate depending upon the rate of thawing at the interface between the disk 20 and the face of the column of blood in engagement therewith. After the disk 20 has traversed the entire distance through the cylinders 42, 45 then the entire portion of the blood has been converted to a liquid phase and the closure 46 removed to use the liquid blood.

It should be noted that the container 40 remains sealed during the entire thawing process so that there is no possibility of contaminating the sterile interior of the container or the contents thereof.

Figure 7:
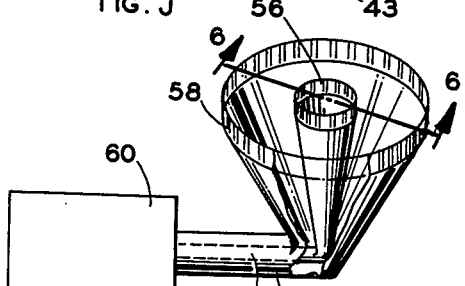
FIGURE 7 is an exploded isometric view of further embodiment of the invention.
Figure 7:
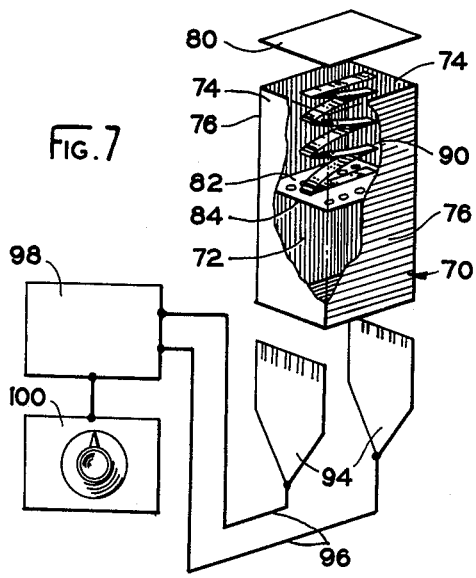

Referring next to the embodiment shown in FIGURE 7 the container 70 has a solid column of frozen blood 72 contained therein. The two opposite sides 74 of the container are electrically conductive and are separated by the other two sides 76 which are non-conductive. End seals of insulating material 80 are provided at the top and bottom of the container.

A rectangular plate 82 of resistive material is received in the container and is proportioned to move slidably therein, and the edges 84 make contact with the inner surface of the walls 74 which are electrically conductive. A spring 90 is compressed between the top closure 80 and the perforated rectangular plate 82. The perforated plate 82, the spring 90 and the top closure member 80, which forms the end seal, are added after the blood is reduced to frozen form.

To thaw the blood the two opposite sides 74 of electrically conductive material are engaged with conductor elements 94 which are electrical connections leading from conductor lines 96 which lead from a radio frequency power generator 98. Suitable control and timing devices 100 may be included to determine the amount of electrical energy and rate to be transmitted to the perforated plate 82 which is a resistance element operating in the same manner as the perforated circular disks in the previous embodiments.

The frozen blood at the interface between the plate 82 and the column of blood becomes thawed and when it converts to a liquid phase it passes through the perforations in the plate 82 and the plate 82 is caused to advance by the spring 90 so that the plate 82 is always in contact with the exposed face of frozen column of blood 72 to transmit its full heating effect thereon. The plate 82 moves at a rate in accordance with the thawing rate of the blood and the thawing operation is completed after the plate 82 has traversed the entire length of the container 70.

The top closure 80 may be removed and the spring 90 withdrawn from the container to use the liquid blood. Several containers 70 may be simultaneously thawed simply by widening the conductor elements 94.

In each of the embodiments minor modifications may be made to suit requirements. For example, in the first described embodiment the heating element may be moved through the container by a spring member so that the induction coil is used only to achieve a transformer effect or magnetic induction action to the disk in the sealed container.

It is also possible to include insulating material on the one side of the heating element or perforated disk so that the liquid material is not subjected to heat. This would have no substantial effect on operation of thawing the frozen portion of the blood. The heating surface can be increased by corrugating surface of the heating element so as to increase the area in contact with the frozen end portion of the column of blood.

In all of the embodiments, however, there is utilized the principle of adding large amounts of heat energy to an interface which warms rapidly and is pressed or forced through the column of frozen blood which is caused to thaw incrementally through its column.

The means for forcing the disk through the column of blood may be either mechanical or electrical (magnetic) means.

It will be further seen that the method of transferring heat energy to the disk can vary widely. For example, in the first embodiment the energy is transferred by transformer effect or magnetic induction action, whereas in the other embodiments the energy is transferred through conductors and electrical circuitry, including the walls of the container.

Since large amounts of heat energy are transferred to the heating element the blood is very quickly thawed so that it traverses through the critical temperature range without damage to the material. This makes the invention adaptable to not only thaw blood but also thaw other temperature-sensitive materials.

It will be apparent to those skilled in the art that other revisions of the invention are possible without departing from the underlying principles which are intended to be included within the scope of the following claims.

I claim:
1. Apparatus for thawing blood comprising a closed container having frozen blood therein, insulating means for sealing said container to prevent contamination of said blood, a perforated metal disk received in said container and proportioned for movement within said container, electrical insulating material provided along the length of said container, electromagnetic means for inducing current flow in said disk to produce heating thereof across the area of the container, said heating being sufficient to thaw the blood in contact with said disk, and means for biasing said disk incrementally through said frozen blood whereby said blood as it thaws is passed through said perforations and the interface of said disk is maintained in engagement with the exposed frozen portion of said blood.

2. Apparatus for thawing blood comprising concentric tubular members having an annular closed chamber therebetween for receiving said frozen blood, insulating means extending the length of each said tubular members to interrupt electrical conductivity circumferentially thereof, insulating covers at the open ends of said annular chamber to shield said frozen blood, a perforated disk proportioned to fit within said annular chamber and movable through said chamber, electromagnetic means adapted to fit within the inner of said tubular members for producing heat energy by induction of alternating current in said disk, and means for electromagnetically biassing said closed perforated disk through said chamber by increments to maintain said heated disk in engagement with frozen blood and to continuously pass the liquid portion thereof through said perforations.

References Cited in the file of this patent
UNITED STATES PATENTS

| | | |
|---|---|---|
| 1,354,757 | Popcke | Oct. 5, 1920 |
| 2,199,816 | Flosdorf | May 7, 1940 |
| 2,471,128 | Stein | May 24, 1949 |
| 2,501,393 | Kendall | Mar. 21, 1950 |
| 2,522,652 | Von Haase | Sept. 19, 1950 |
| 2,676,234 | Lackner et al. | Apr. 20, 1954 |
| 2,868,938 | Barfield et al. | Jan. 13, 1959 |
| 2,876,769 | Cordova | Mar. 10, 1959 |
| 2,934,067 | Calvin | Apr. 26, 1960 |

OTHER REFERENCES

Science, October 14, 1949, volume 110, pages 398 and 399.

JAMA, volume 161, No. 12, Foreign Letters, page 1179, July 21, 1956.